United States Patent
Denzik et al.

(10) Patent No.: US 11,873,198 B2
(45) Date of Patent: Jan. 16, 2024

(54) LIFT SUPERSTRUCTURE ARM PIN

(71) Applicant: Vehicle Service Group, LLC, Madison, IN (US)

(72) Inventors: Zack Denzik, Madison, IN (US); Ron Schneider, Madison, IN (US); Kyle Smith, Madison, IN (US); Scott Tucker, Madison, IN (US)

(73) Assignee: Vehicle Service Group, LLC, Madison, IN (US)

( * ) Notice: Subject to any disclaimer, the term of this patent is extended or adjusted under 35 U.S.C. 154(b) by 204 days.

(21) Appl. No.: 17/369,457

(22) Filed: Jul. 7, 2021

(65) Prior Publication Data

US 2023/0011902 A1  Jan. 12, 2023

(51) Int. Cl.
*B66F 3/38* (2006.01)
*B66F 3/46* (2006.01)

(52) U.S. Cl.
CPC . *B66F 3/38* (2013.01); *B66F 3/46* (2013.01)

(58) Field of Classification Search
CPC ...... B66F 7/16; B66F 7/10; B66F 7/02; B66F 7/025; B66F 7/20; B66F 3/46
See application file for complete search history.

(56) References Cited

U.S. PATENT DOCUMENTS

| | | | |
|---|---|---|---|
| 2,777,538 A | 1/1957 | Cochin | |
| 3,237,723 A * | 3/1966 | Halstead | B66F 7/18 187/219 |
| 5,740,886 A | 4/1998 | Fletcher | |
| 6,571,919 B1 | 6/2003 | Stewart | |
| 6,814,187 B2 | 11/2004 | Brown et al. | |
| 9,550,658 B2 * | 1/2017 | Uhl | B66F 7/10 |
| 2005/0235460 A1 | 10/2005 | Stewart | |
| 2012/0325587 A1 * | 12/2012 | Matthews | B66F 7/28 187/216 |
| 2020/0079627 A1 * | 3/2020 | Perlstein | B66F 3/46 |
| 2021/0114852 A1 * | 4/2021 | Heath | B66F 7/28 |
| 2021/0331904 A1 * | 10/2021 | Kritzer | B66F 7/28 |
| 2022/0259020 A1 * | 8/2022 | Stewart | B66F 7/28 |

FOREIGN PATENT DOCUMENTS

| | | |
|---|---|---|
| DE | 1531325 A1 | 7/1970 |
| JP | 2003-146594 A | 5/2003 |
| WO | WO 2020/097605 A2 | 5/2020 |

OTHER PUBLICATIONS

Extended European Search Report dated Apr. 12, 2022, for Application No. 21206850.6, 7 pages.

* cited by examiner

*Primary Examiner* — Seahee Hong
(74) *Attorney, Agent, or Firm* — Frost Brown Todd LLP

(57) ABSTRACT

A lift assembly including a lifting structure, a lifting arm, a yoke structure fixed to the lifting structure, a pin pivotally coupling the lifting arm with the yoke structure, and an integrated anti-rotational assembly associated with both the yoke structure and the pin. The lifting structure can actuate relative to the ground between a lowered position and a raised position. The lifting arm is configured to actuate with the lifting structure between the lowered position and the raised position. The integrated anti-rotational assembly can inhibit rotation of the pin relative to the yoke structure about the longitudinal axis of the pin.

20 Claims, 10 Drawing Sheets

LIFT SUPERSTRUCTURE ARM PIN

BACKGROUND

A variety of automotive lift systems have been made and used over the years in a variety of contexts. Some types of automotive lifts are installed in-ground while other types are installed above-ground. In some in-ground lifts, one or more posts are selectively retractable/extendable relative to the ground to raise/lower a vehicle relative to the ground. For instance, a single post may be positioned under the center of the vehicle. Alternatively, one post may be positioned at one side of the vehicle while another post is positioned at the opposite side of the vehicle. Such one or more posts may include superstructures that are capable of engaging the vehicle. Such superstructures may be mounted to the tops of the posts such that the superstructure is raised/lowered relative to the ground as the one or more posts are retracted/extended relative to the ground. Such superstructures may include a yoke with one or more arms movably mounted thereto. For instance, a yoke may have a pair of arms that are movable relative to the yoke to selectively position the arms relative to the yoke. Each arm may have a member that is configured to engage the vehicle.

Examples of automotive lifts and associated components are disclosed in U.S. Pat. No. 5,740,886, entitled "Method of Retrofit of In-Ground Automotive Lift System," issued Apr. 21, 1998; U.S. Pat. No. 6,571,919, entitled "Removable Cylinder Arrangement for Lift," issued Jun. 3, 2003; U.S. Pat. No. 6,814,187, entitled "System for Detecting Liquid in an Inground Lift," issued Nov. 9, 2004; and U.S. Pat. No. 9,550,658, entitled "Inground Superstructure and Integrated Third Stage Arm for Vehicle Lift," issued Jan. 24, 2017; the disclosure of all of which are incorporated by reference herein.

While a variety of automotive lifts and associated components have been made and used, it is believed that no one prior to the inventor(s) has made or used an invention as described herein.

BRIEF DESCRIPTION OF THE DRAWINGS

While the specification may conclude with claims which particularly point out and distinctly claim the invention, it is believed the present invention will be better understood from the following description of certain examples taken in conjunction with the accompanying drawings, in which like reference numerals identify the same elements and in which:

Figure 1A:
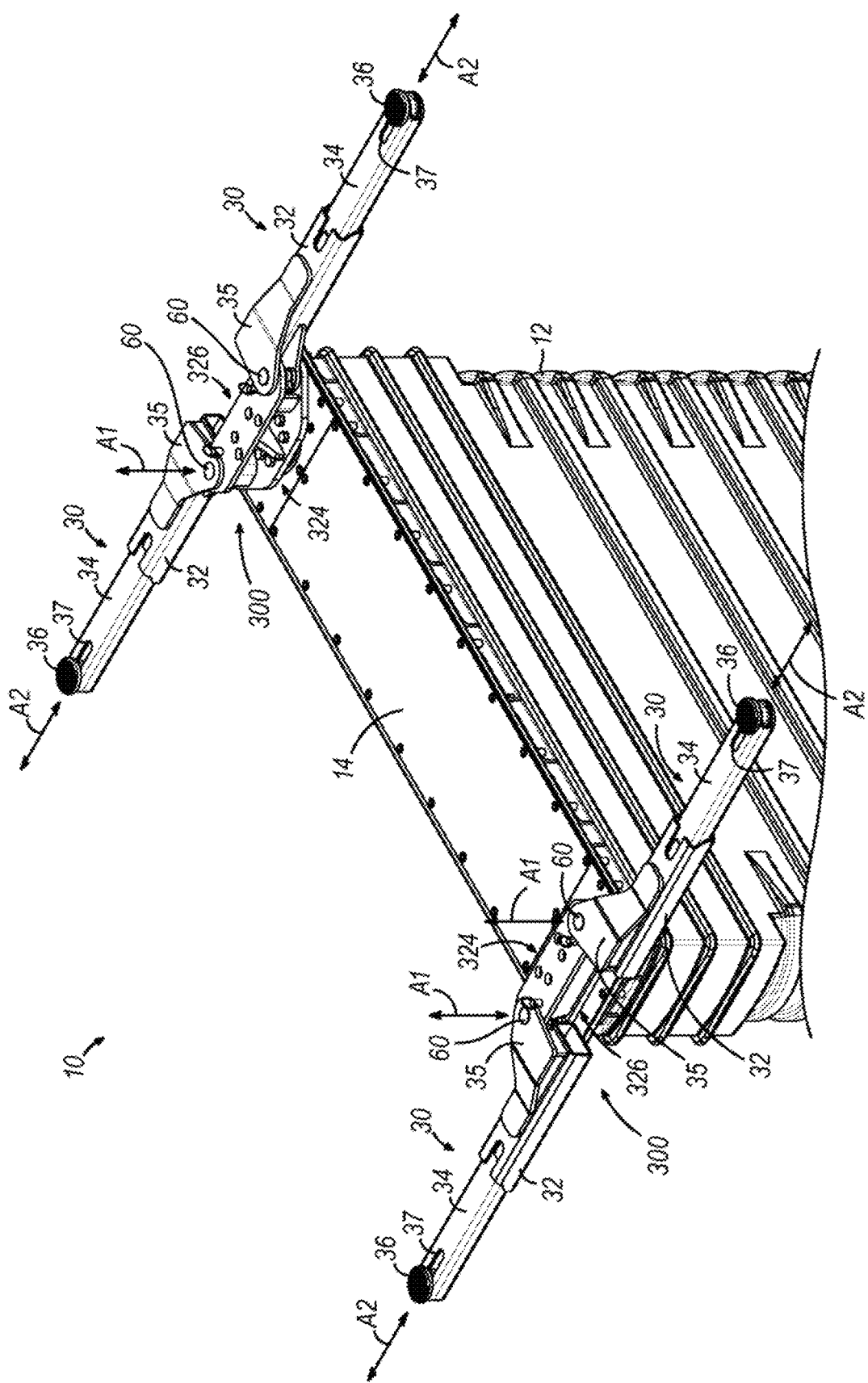
FIG. 1A is a perspective view of an exemplary vehicle lift system, with its arms extending in a parallel position and its posts in a retracted position relative to the ground.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the resent invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is, by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. OVERVIEW OF EXEMPLARY LIFT

Figure 1B:
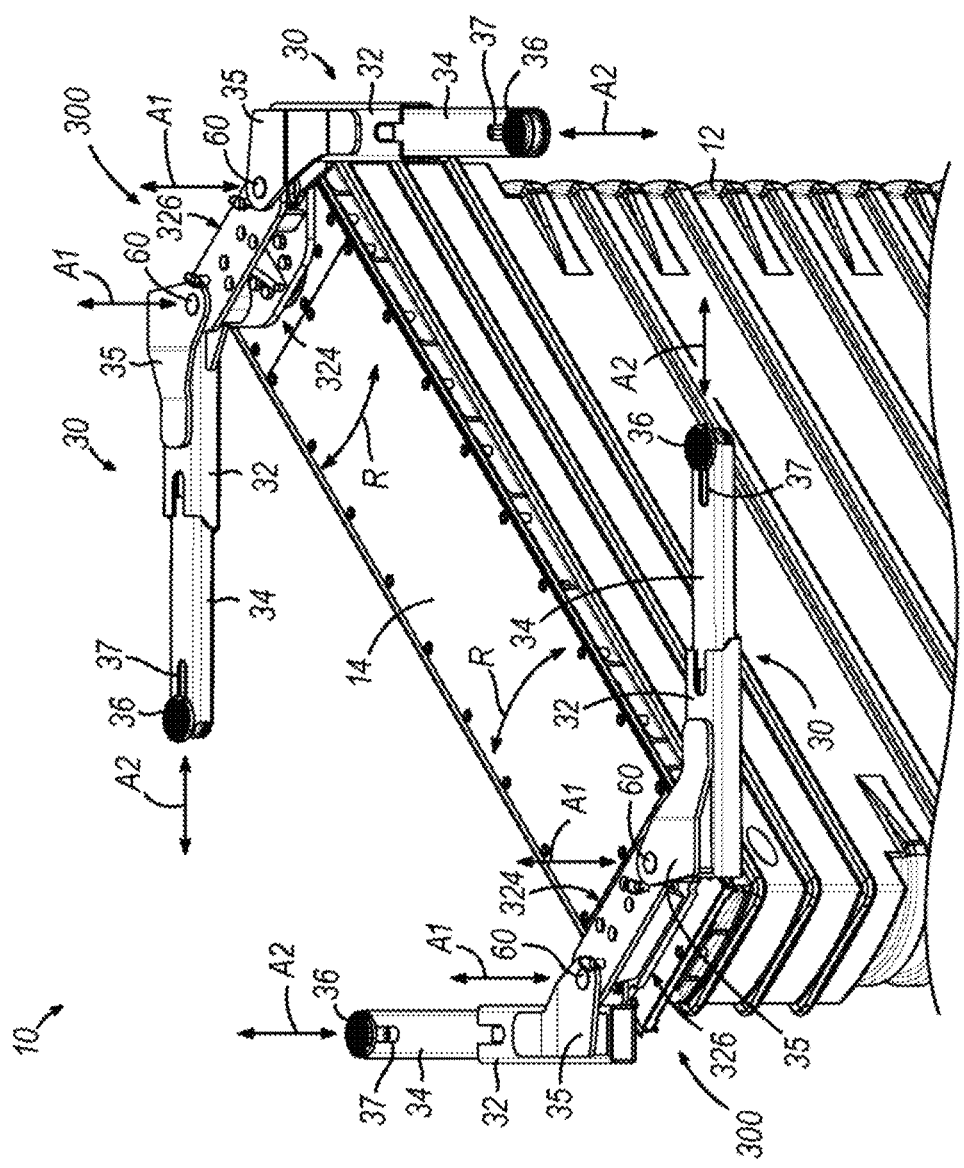
FIG. 1B is a perspective view of an exemplary vehicle lift system, with its arms rotated to a first vehicle engagement position and its posts in the retracted position relative to the ground.
Figure 1C:
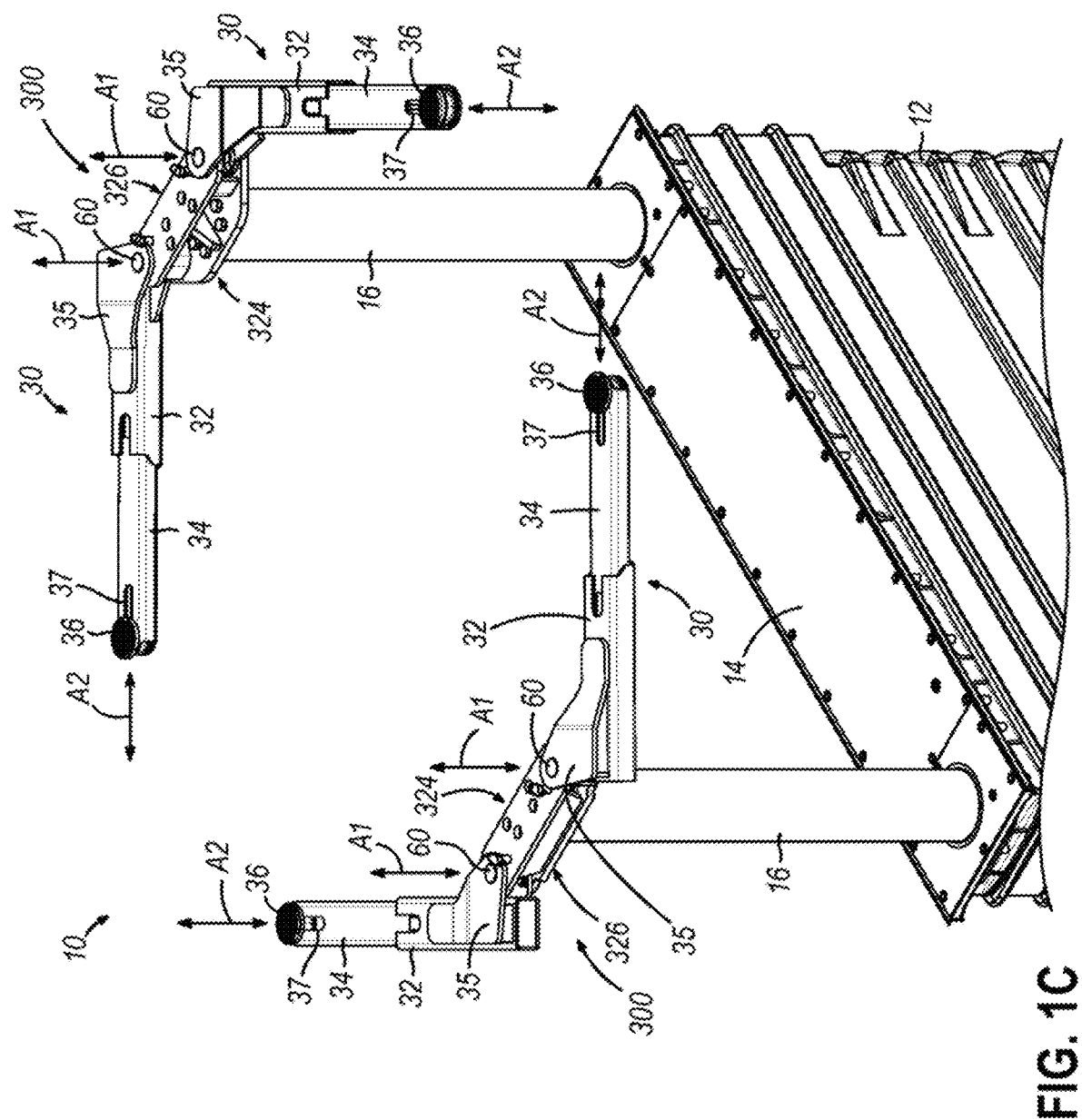
FIG. 1C is a perspective view of an exemplary vehicle lift system, with its arms in the first vehicle engagement position and its posts in an extended position relative to the ground.

FIGS. 1A-1C illustrate an exemplary lift (10). Lift (10) of the present example includes a housing (12) that extends beneath the level of ground (e.g., shop floor, etc.), a base plate (14) that is fixedly positioned at about the level of ground, and a lifting structure configured to virtually actuate in order to lift a vehicle. In the current example, lifting structure includes a pair of posts (16) that extend or retract relative to the level of ground. For instance, FIGS. 1B-1C show posts (16) transitioning from a lowered, retracted position to a raised, extended position relative to the ground.

Figure 2:
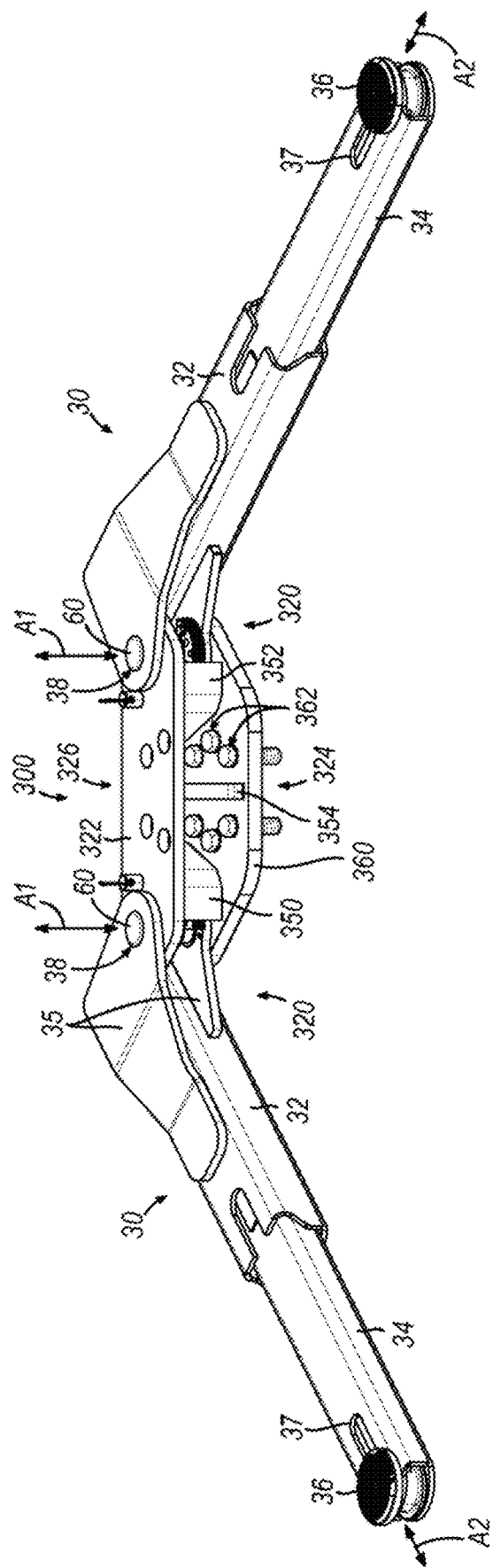
FIG. 2 is perspective view of a superstructure and a pair of arms of the vehicle lift system of FIG. 1.
Figure 3:
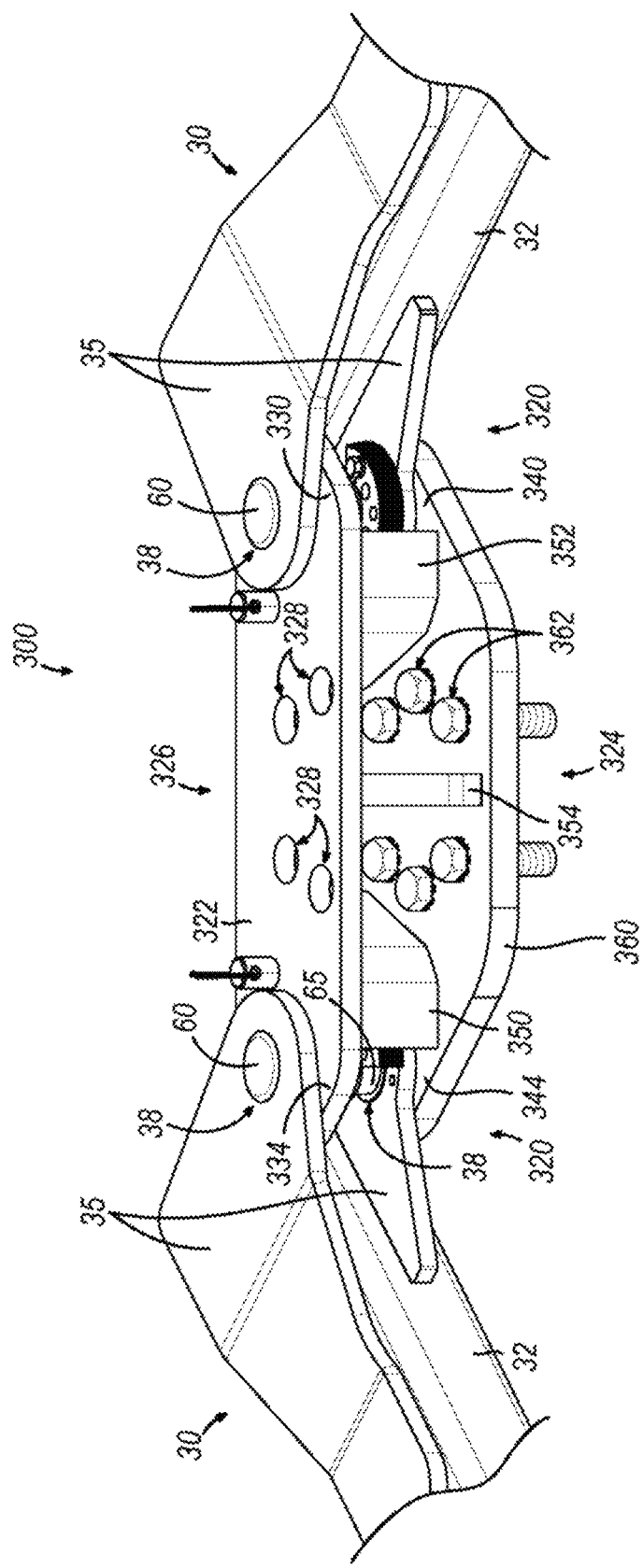
FIG. 3 is an enlarged perspective view of the superstructure and the pair of arms of FIG. 2.
Figure 4:
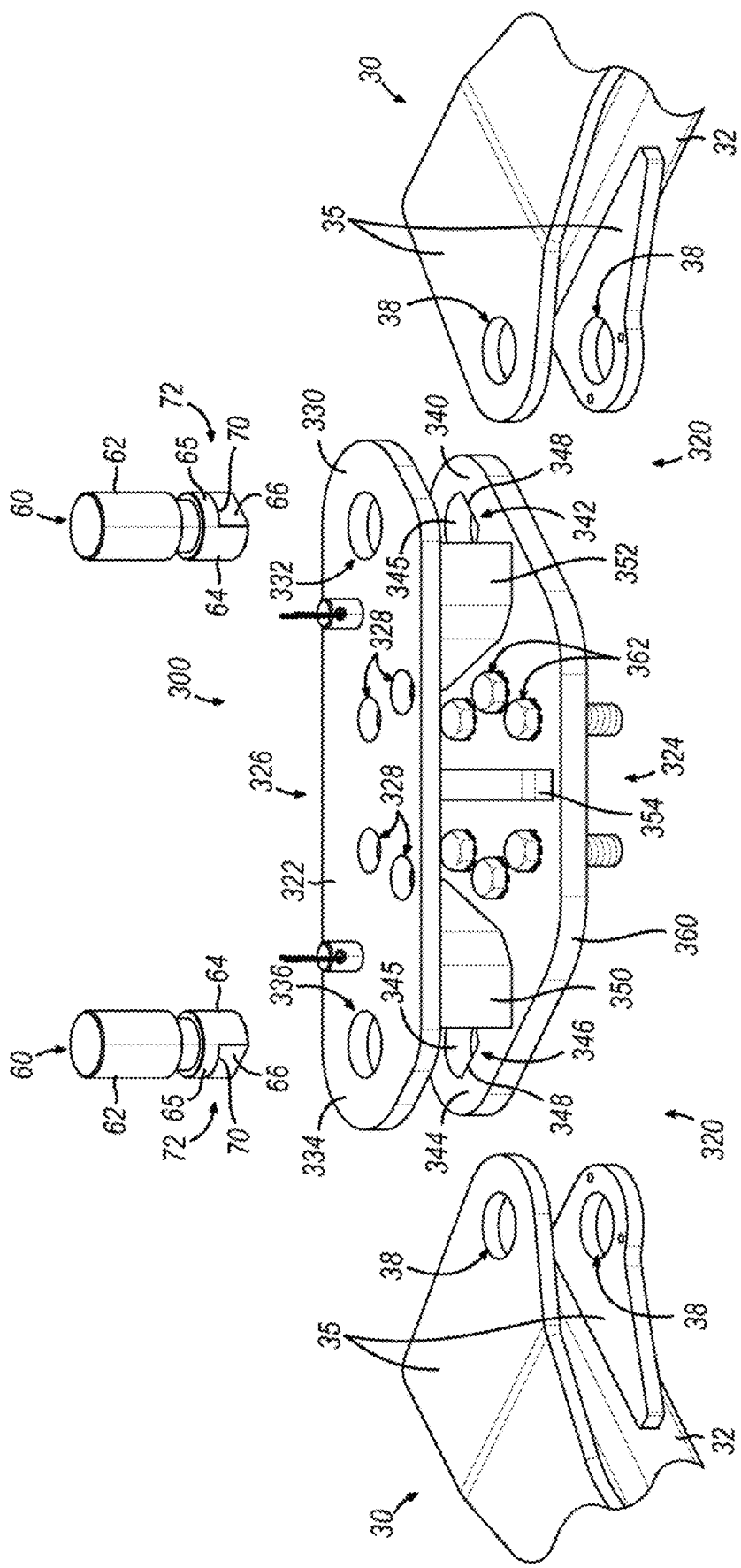
FIG. 4 is an exploded perspective view of the superstructure and the pair of arms of FIG. 2.

A superstructure (300) is fixedly mounted to the top of each post (16). As best shown in FIGS. 2-4, each superstructure (300) includes a top plate (322) fixed to a bottom plate (360) via a plurality of vertical walls (350, 352, 354). Bottom plate (360) defines mounting holes (362) which are utilized to secure superstructure (300) to the top of each post (16). Top plate (322) and bottom plate (360) together form a pair of yokes (320). Each yoke (320) is associated with a respective pair of arms (30), which are pivotally secured to their corresponding yoke (320). In particular, each arm (30) is joined to its corresponding yoke (320) by a pin (60). Therefore, superstructures (300) act as a coupling structure between arms (30) and a respective post (16) such that actuation of posts (16) leads to actuation of respective arms (30). As best shown in FIGS. 1A-1B, each arm (30) is rotatable about the longitudinal axis (A1) defined by its corresponding pin (60) in the direction shown by rotational arrow (R). As will be described in greater detail below, arms (30) may be rotated about its corresponding pin (60) in order to suitably align with a lifting point of a vehicle.

In the current example, each arm (30) is expandable and retractable along its own longitudinal axis (A2) to achieve various desirable lengths. In the current example, each arm (30) includes telescoping segments (32, 34), where base segment (32) is pivotably coupled with a corresponding yoke (320) via coupling plates (35) and pin (60), and where second segment (34) is configured to extend and retract relative to base segment (32) in order to achieve the desired length of each individual arm (30). Therefore, each arm (30) is both pivotable about a longitudinal axis (A1) of its respective pin (60) and longitudinally adjustable about its own longitudinal axis (A2).

A vehicle engagement member (36) may be slidably contained within a slot defined by a corresponding second segment (34). Vehicle engagement member (36) is configured to contact the underside of a vehicle such that arms (30) may suitably engage a vehicle for lifting purposes in accordance with the description herein. Vehicle engagement member (36) may be slidable along slot (37) relative to second segment (34) such that the placement of vehicle engagement member (36) along the longitudinal axis (A2) of arm (30) may be "fine-tuned" to suitably engage a lifting point of a vehicle without having to adjust the placement of second segment (34) relative to base segment (32) along its respective axis (A2). In some instances, vehicle engagement members (36) may be fixed relative to second segment (34).

Therefore, arms (30) are configured to engage a vehicle and may be selectively positioned to engage a particular vehicle at particular lift points associated with the particular vehicle. For instance, with posts (16) retracted in the ground as shown in FIG. 1A, arms (30) may be initially positioned to accommodate a vehicle between posts (16). The vehicle may then drive to position over base plate (14) (e.g., such that the length of the vehicle is substantially centered over base plate (14)).

With the vehicle suitably positioned relative to lift (10), arms (30) may be rotated inwardly about pins (350), as exemplified between FIGS. 1A-1B, to locate the vehicle engagement members (36) at lift point positions underneath the vehicle. If needed, second segments (34) may be extended and retracted relative to base segments (32), while vehicle engagement members (36) may slide along slot (37) in a respective second segment (34) to suitably align vehicle engagement members (36) with lift point positions underneath the vehicle.

With arms (30) at appropriate positions, posts (16) may be extended relative to the ground, as can be seen by comparing FIGS. 1B-1C. With arms (30) being engaged with the vehicle at the selected lift points, and with arms (30) being engaged with posts (16) via superstructures (300), such extension of posts (16) will raise the vehicle relative to the ground.

II. EXEMPLARY SUPERSTRUCTURE AND ARM PIN WITH INTEGRATED ANTI-ROTATION FEATURES

As mentioned above, each arm (30) is joined to its corresponding yoke (320) by a pin (60) such that arms (30) may rotate relative to yokes (320) about the longitudinal axis (A1) defined by pin (60). Further, as mentioned above, arms (30) are configured to engage and lift a vehicle in response to posts (16) extending relative to ground. Therefore, the load from lifting a vehicle is transmitted through arms (30) onto superstructures (300) via pins (60). While arms (30) may rotate about the longitudinal axis (A1) defined by its respective pin (60), it may be desirable to ensure that pin (60) itself is rotationally fixed relative to its corresponding yoke (320) about its own longitudinal axis (A1). In other words, it may be desirable to rotationally fix pin (60) relative to yoke (320) such that as a user rotate arms (30) in the direction of arrows (R) in accordance with the description above, pins (60) do not rotate relative to the respective yoke (320).

Rotationally fixing pin (60) relative to its corresponding yoke (320) may predictably control the sections of pin (60) that undergo compression and tension, respectively, while transmitting the load from lifting vehicles between arm (30) and superstructure (300). This may increase the structural integrity of pin (60), the lifespan of pin (60), etc. For example, in some embodiments in which pin (60) is hardened, normal use may wear (thereby enlarging) the hole in the superstructure, causing the arm to droop. Such embodiments of the present structure allow the arm structure to be repaired easily.

Using a separate piece of hardware to rotationally fix pins (60) relative to their respective yoke (320) (e.g., by attaching a separate piece of hardware to either yoke (320) or pin (60) after pin (60) is suitably coupled with yoke (320)) may be undesirable. For instance, during initial assembly of arms (30) to yoke (320), an installer may forget or otherwise fail to suitably install the separate piece of hardware to rotationally fix pins (60) to respective yokes (320), thereby allowing pins (60) to rotate relative to yoke (320) during exemplary use. As another example, a separate piece of hardware may become damaged after exemplary use such that pin (60) is no longer rotationally fixed relative to yoke (320). Further, such separate hardware adds height to the point of attachment, and that may sometimes get in the way of vehicle doors as technicians enter and exit the vehicle in connection with getting it into place or removing it from the bay.

Therefore, it may be desirable to provide a yoke (320) and pin (60) that include integrated anti-rotational features such that once pin (60) is installed to couple yoke (320) with a respective arm (30), pin (60) and yoke (320) are positioned to immediately inhibit rotation relative to each other about the longitudinal axis (A1) defined by pin (60). As will be described in greater detail below, yoke (320) includes a pair of openings (342, 346) with flattened surfaces (348) dimensioned to receive a bottom portion (64) of pin (60) having a corresponding flattened surface (66). As will also be described in greater detail below, flattened surfaces (348, 66) help inhibit rotation of pin (60) relative to yoke (320) about the longitudinal axis (A1) of pin (60).

Figure 6:
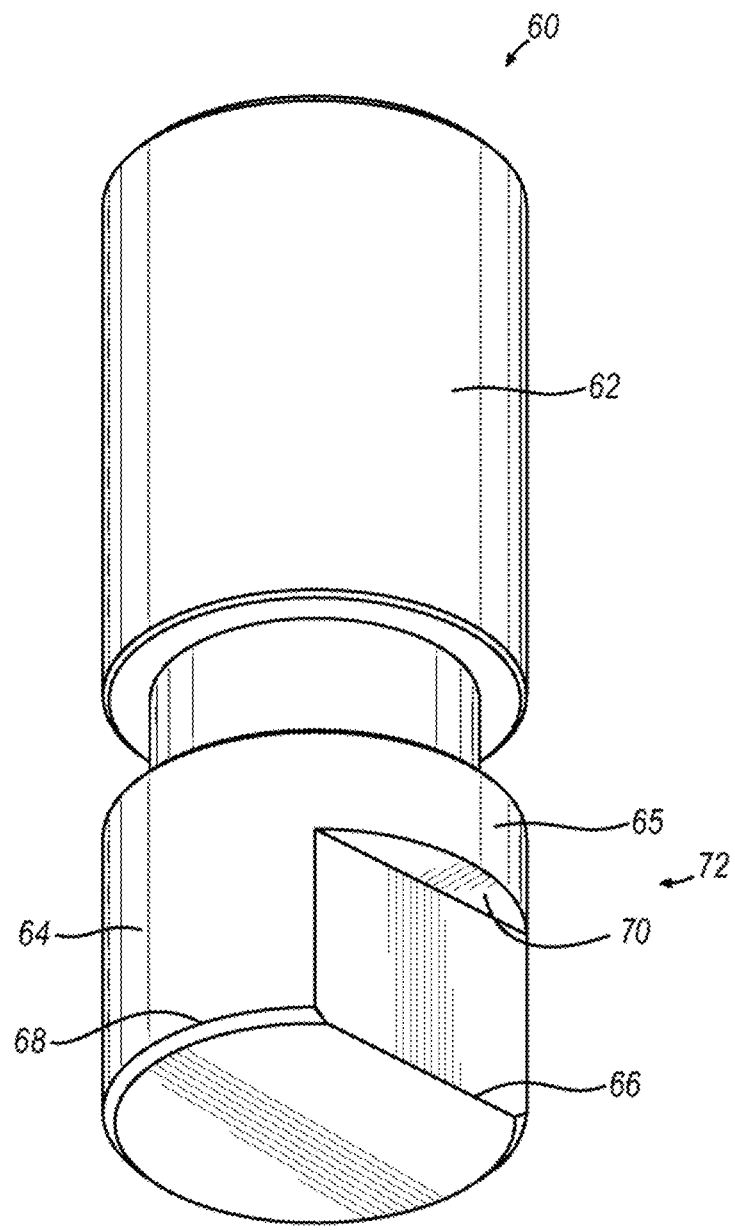
FIG. 6 is a perspective view of a pin utilized to couple an arm of the pair of arms with the superstructure of FIG. 2.

FIG. 2 shows superstructure (300), pins (60), and arms (30) coupled together in accordance with the description herein. As best shown in FIGS. 2 and 6, base segment (32) of each arm (30) includes coupling plates (35) each defining a pin opening (38). Pin openings (38) are dimensioned to receive pin (60) such that pin (60) may pivotally couple arm (30) with yoke (320) in accordance with the description herein.

As mentioned above, and as best shown in FIGS. 2-4, yokes (320) are formed from top plate (322) and bottom plate (360), which are connected to each other via connecting walls (350, 352, 354). Bottom plate (360) defines mounting holes (362), which are dimensioned to receive mounting bolts to couple superstructure (300) with a respective post (16). Top plate (322) defines a plurality of access holes (328) that allow easier access to the mounting bolts or other items within the space between top plate (322) and bottom plate (360).

Top plate (322) includes a first upper tongue portion (330) and a second upper tongue portion (334), each helping form a respective yoke (320). First upper tongue portion (330) defines an opening (332) that is sized to receive a pin (60), thereby pivotally coupling a corresponding arm (30) with its respective yoke (320). Second upper tongue portion (334) also defines an opening (336) that is sized to receive a pin (60), thereby pivotally coupling a corresponding arm (30) with its respective yoke (320).

Bottom plate (360) includes a first lower tongue portion (340) positioned directly below first upper tongue portion (330), thereby forming a respective yoke (320). Similarly, bottom plate (360) also includes a second lower tongue portion (344) positioned directly below second upper tongue portion (334), thereby forming a respective yoke (320). First lower tongue portion (340) defines an opening (342) that is substantially aligned with opening (332) and is configured to receive pin (60). Similarly, second lower tongue portion (340) defines an opening (346) that is substantially aligned with opening (336) and is configured to receive pin (60).

Figure 5:
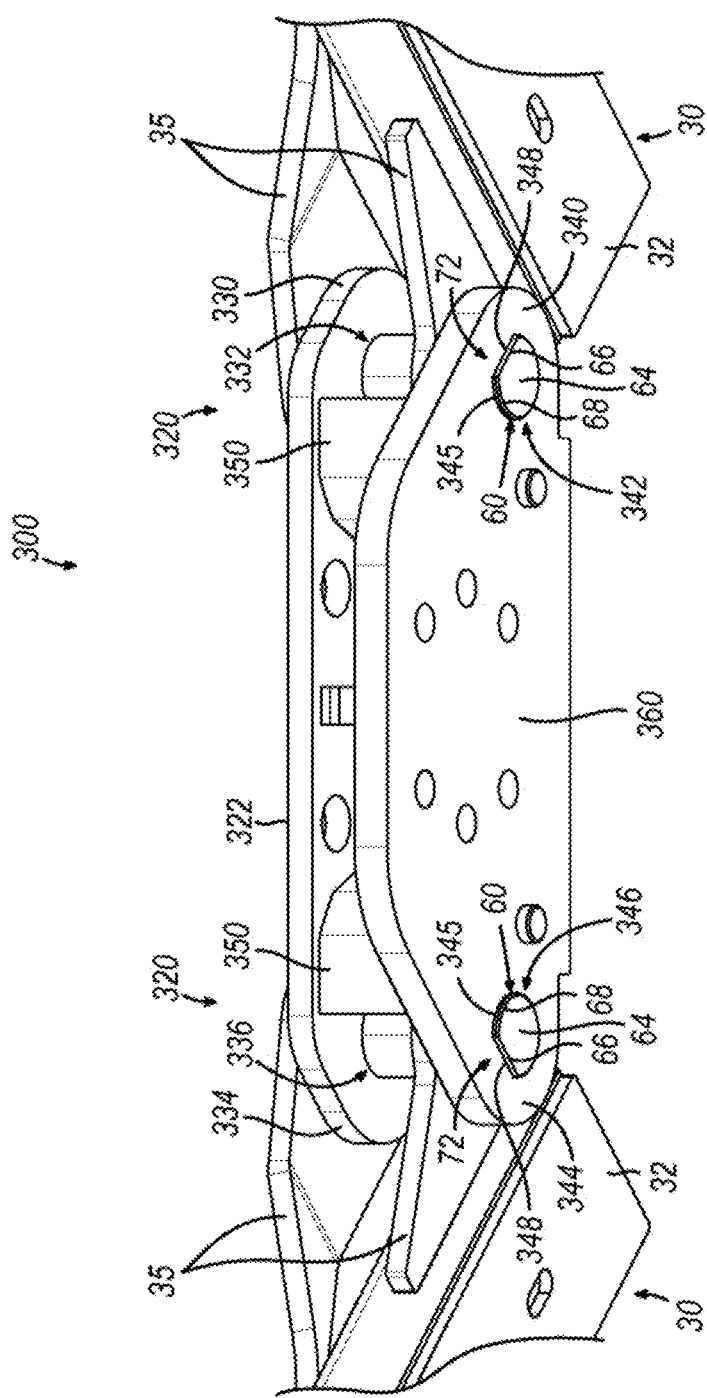
FIG. 5 is a perspective view of the underside of the superstructure and the pair of arms of FIG. 2.
Figure 7:
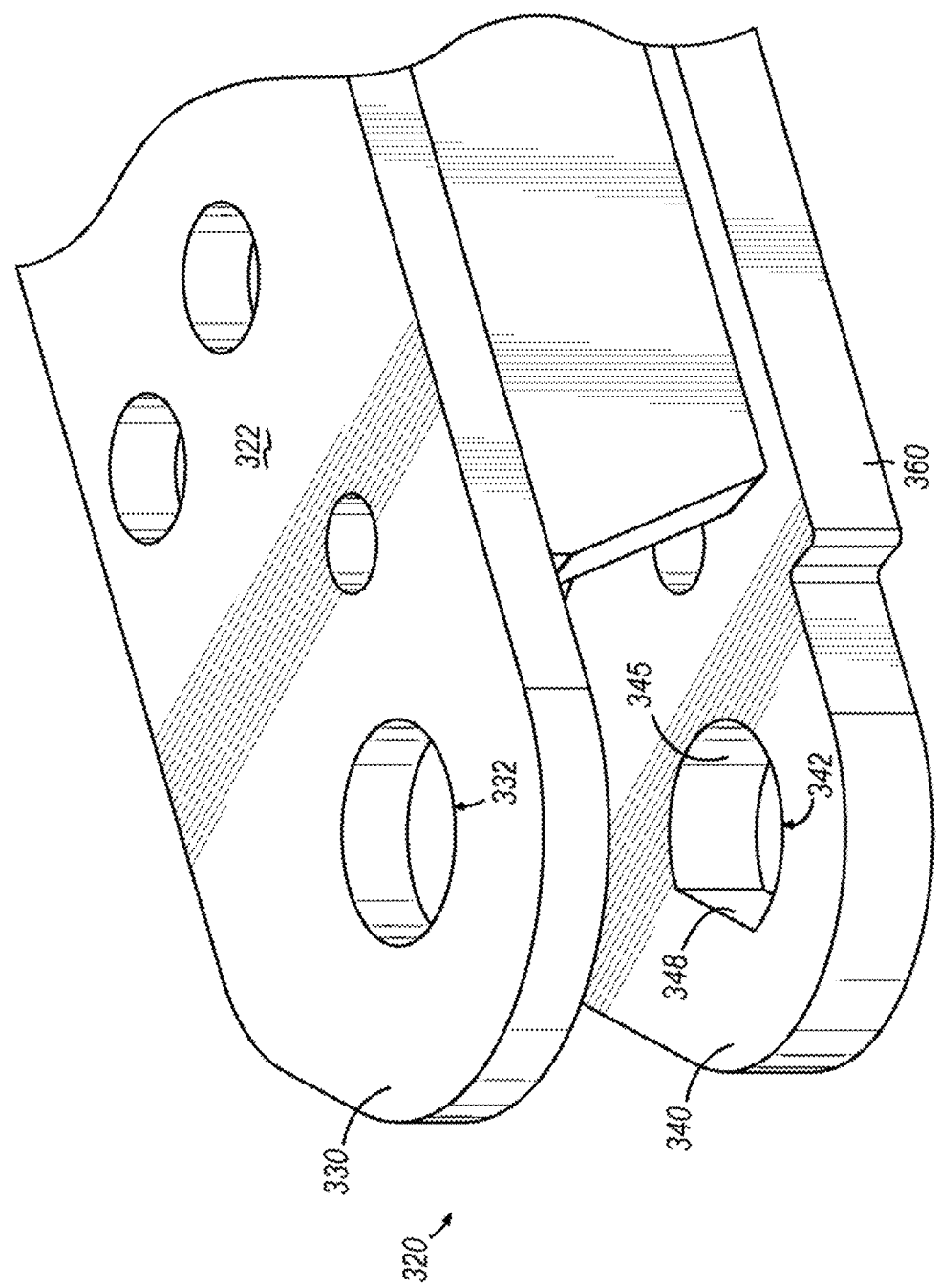
FIG. 7 is an enlarged perspective view of a yoke assembly of the superstructure of FIG. 2.

The portion of lower tongues (340, 344) defining each opening (342, 346) include a circumferentially extending surface (345) and a flattened surface (348) that together function as integrated anti-rotational features when coupled with pin (60). Together, flattened surface (348) and circumferentially extending surface (345) form openings (342, 346) such that the openings resemble a "D" shape, as shown in FIGS. 4, 5, and 7.

Turning to FIG. 6, pin (60) includes an upper portion (62) and a bottom portion (64). Upper portion (62) of pin (60) is substantially cylindrical and dimensioned to be housed within openings (332, 336) of top plate (322) and pin opening (38) of the upper coupling plate (35) (as shown in FIG. 4). The section of upper portion (62) extending within openings (38, 332, 336) is substantially cylindrical in order to promote rotation of arm (30) relative to its respective yoke (320) in accordance with the description herein.

Figure 8:
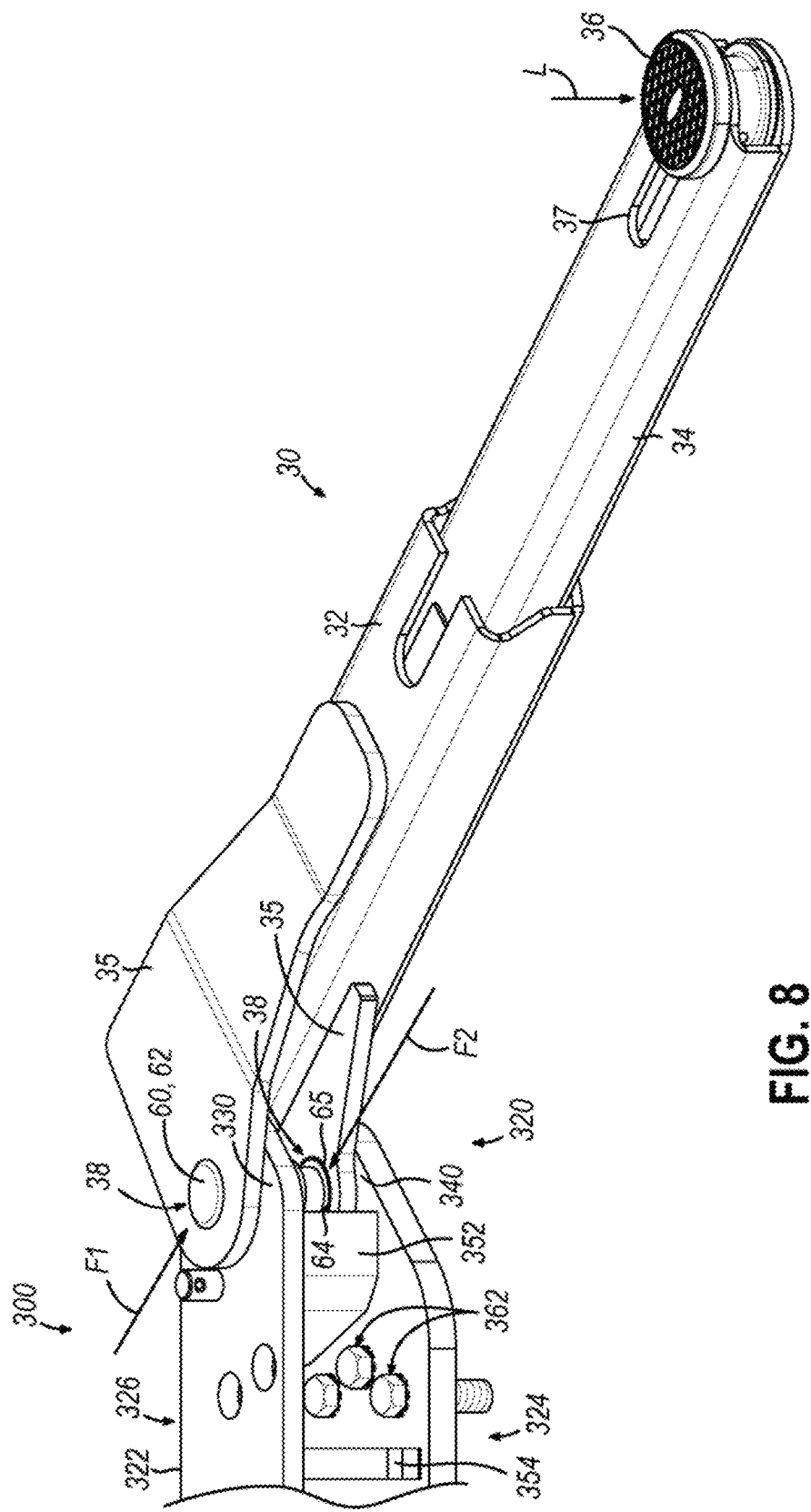
FIG. 8 is a perspective view of an arm coupled with the superstructure of FIG. 2, where the arm is experiencing a downward load from lifting a vehicle, and where the pin of FIG. 6 is transferring the load from the arm onto the superstructure.

Bottom portion (64) includes a substantially uniform cylindrical section (65) located above an integrated anti-rotational feature (72). As best shown in FIGS. 3 and 8, uniform cylindrical section (65) is dimensioned to be housed within pin opening (38) of the lower coupling plate (35) of arm (30) in order to promote rotation of arm (30) relative to pin (60) and yoke (320) in accordance with the description herein.

Turning back to FIG. 6, anti-rotational feature (72) includes a flattened surface (66) and a circumferentially extending surface (68) that together form a complementary "D" shape to that of surfaces (348, 345) described above. Bottom portion (64) also includes a pin support surface (70) extending inwardly from a bottom portion of uniform cylindrical section (65) toward a top portion of flattened surface (66).

Bottom portion (64) is dimensioned smaller than openings (332, 336) of upper plate (322) such bottom portion (64) may be inserted through openings (332, 336). As best shown in FIG. 5, anti-rotational feature (72) is dimensioned to fit within openings (342, 346) such that when inserted, flatted surface (66) of anti-rotational feature (72) is directly adjacent to flattened surface (348) of the corresponding opening (342, 346). Similarly, anti-rotational feature (72) is dimensioned to fit within openings (342, 346) such that when inserted, circumferentially extending surface (68) of bottom portion (54) of pin (60) is directly adjacent to circumferentially extending surface (345) of the corresponding opening (342, 346).

These integral corresponding "D" shapes of pin (60) and opening (342, 346) inhibit substantial rotation of pin (60) relative to yoke (320) during exemplary use of lift (10) in accordance with the description herein. In particular, flattened surfaces (66, 348) abut against each other while integrated anti-rotational feature (72) is housed within opening (342, 346). Therefore, while arm (30) is free to rotate relative to yoke (320) due to suitable compatibility between pin (60) and pin openings (38) of arm (30); pin (60) is inhibited from rotating relative to yoke (320) due to the interaction between integrated anti-rotational feature (72) and openings (342, 346).

During installation of lift (10), an installer may suitably align top coupling plate (35) with top plate (322) of a respective yoke (320) and suitably align bottom coupling plate (35) with bottom plate (360) of the respective yoke (320). When these features are suitably aligned, pin holes (38) will be aligned with corresponding openings (332, 336, 342, 346). Next, the installer may insert bottom portion (64) of pin (60) through pin hole (38) of top coupling plate (35) and the corresponding opening (332, 336) of top plate (322) of yoke (320). Next, the installer may further insert bottom portion (64) of pin (60), while flattened surfaces (66, 348) are suitably aligned, until uniform cylindrical section (65) is housed within pin hole (38) of bottom coupling plate (35) and integral anti-rotational feature (72) is housed within the corresponding opening (342, 346). Pin support surface (70) may rest against lower plate (360) when integral anti-rotational feature (72) is suitably housed within the corresponding openings (342, 346) in order to prevent pin (60) from falling through openings (332, 336, 342, 346) and dissociating with yoke (320).

With integral anti-rotational feature (72) housed within corresponding opening (342, 346), arm (30) may be pivotally coupled with yoke (320). Because integral anti-rotational feature (72) and the corresponding "D" shape of openings (342, 346) interact with each other, pin (60) is automatically inhibited from rotating relative to yoke (320) upon pivotally coupling arm (60) with yoke (320).

As best shown in FIGS. 4, 5, and 7, flattened surface (348) is located in some embodiments adjacent to a vehicle facing side (324) of yoke (320), while circumferentially extending surface (345) is located adjacent to the rear side (326) of yoke portion (i.e., the side of yoke (320) facing away from a vehicle being lifted in accordance with the description herein). This placement of flattened surface (348) and circumferentially extending surface (345) may be beneficial as arm (30) lifts a vehicle.

As shown in FIG. 8, when arm (30) is lifting a vehicle, a load (L) is imparted in the downward direction on arm (30), causing a bending moment within arm (30). This bending moment may be transferred to pin (60) via shear forces (F1, F2) transmitted from top and bottom coupling plates (35) to top portion (62) and bottom portion (64) of pin (60), respectively. Due to the bending moment in arm (30), shear force (F2) from bottom coupling plate (35) is transferred onto pin (60) in the direction toward rear side (326) of yoke (320), which in turn pushes bottom portion (64) of pin (60) against circumferentially extending surface (345). Since circumferentially extending surface (345) has more surface area compared to flattened surface (348), this greater surface contact between pin (60) and superstructure (300) may yield better load distribution in holes (342, 346) as compared to if the placement of flattened surface (348) and circumferentially extending surface (345) were reversed respective to vehicle facing side (324) and rear side (326) of yoke (320).

While a complementary "D" shape is utilized as the integral anti-rotational feature in the current example, any other suitable geometry may be utilized as the integral anti-rotational feature as would be apparent to one skilled in the art in view of the teachings herein. For instance, instead of a surface (348) being flattened, an undulating surface may be utilized to inhibit rotation of pin (60) relative to yoke (320). Alternatively, the integral anti-rotational feature may be star-shaped, triangular-shaped, oval-shaped, etc.

Superstructure (300) may be formed of laser-cut plates having a thickness of ½ inch or less. Alternatively, superstructure (300) may be formed of any other suitable materials in any suitable fashion.

While the integral anti-rotation features of pin (60) and yoke (320) have been described above as being usable with a two-post in-ground lift system, it should be understood that such integral anti-rotation features of pin (60) and yoke (320) may be used in a variety of other types of lift systems. For instance, pin (60) and yoke (320) may be readily modified for use in a one-post in-ground lift system. As another merely illustrative example, pin (60) and yoke (320) may be readily modified for use in a two-post above-ground lift system. For instance, a two-post above-ground lift system may include a carriage on each post with a hydraulic mechanism or other type of mechanism to selectively raise/lower the carriages along the posts, and yoke (320) may be secured to each such carriage, such that the carriage, pins (60), and yoke (320) together define a vehicle carrier (or such that the yoke (320) may itself be secured to the post and be regarded itself as a vehicle carrier, etc.). As yet another merely illustrative example, the lift systems taught in any of the patents cited herein may be readily modified to include pin (60) and yoke (320). Various other suitable types of lift systems in which superstructure (300) may be incorporated will be apparent to those of ordinary skill in the art in view of the teachings herein. Likewise, various suitable ways in which superstructure (300) may be incorporated into various types of lift systems will be apparent to those of ordinary skill in the art in view of the teachings herein.

III. EXEMPLARY EMBODIMENTS

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A first exemplary embodiment is a lift assembly, comprising (a) a lifting structure configured to actuate relative to the ground between a lowered position and a raised position; (b) a lifting arm coupled with the lifting structure, where the lifting arm is configured to actuate with the lifting structure between the lowered position and the raised position; (c) a yoke structure fixed to the lifting structure; (d) a pin configured to couple the lifting arm with the yoke structure such that the lifting arm is configured to rotate relative to the yoke structure about a longitudinal axis of the pin; and (e) an integrated anti-rotational assembly associated with both the yoke structure and the pin, wherein the integrated anti-rotational assembly is configured to inhibit rotation of the pin relative to the yoke structure about the longitudinal axis of the pin.

Example 2

A second exemplary embodiment is a variation of Example 1, wherein the integrated anti-rotational assembly comprises a D-shaped through hole defined by the yoke structure.

Example 3

A third exemplary embodiment is a variation of Example 2, wherein the integrated anti-rotational assembly comprises a D-shaped projection of the pin, wherein the D-shaped projection is dimensioned to fit within the D-shaped through hole.

Example 4

A fourth exemplary embodiment is a variation of Example 3, wherein the D-shaped through hole comprises a linear surface and a circumferentially extending surface, wherein the linear surface is closer to a vehicle engagement side of the yoke structure, and wherein the circumferentially extending surface is closer to a rear side of the yoke structure.

Example 5

A fifth exemplary embodiment is a variation of Example 1, wherein the yoke structure comprises a top plate and a bottom plate.

Example 6

A sixth exemplary embodiment is a variation of Example 5, wherein the bottom plate comprises a fixing feature configured to accommodate fixing the yoke structure to the lifting structure.

Example 7

A seventh exemplary embodiment is a variation of Example 6, wherein the fixing feature comprises a plurality of through holes.

Example 8

An eighth exemplary embodiment is a variation of Example 7, wherein the top plate defines a plurality of access holes.

Example 9

A ninth exemplary embodiment is a variation of Example 5, wherein the top plate and the bottom plate are fixed to each other via a plurality of vertical walls.

Example 10

A tenth exemplary embodiment is a variation of Example 1, wherein the lifting arm comprises a base segment and a telescoping segment configured to actuate relative to each other in order to adjust a length of the lifting arm.

Example 11

An eleventh exemplary embodiment is a variation of Example 10, wherein the lifting arm further comprises a vehicle engagement member extending from the telescoping segment.

Example 12

A twelfth exemplary embodiment is a variation of Example 11, wherein the vehicle engagement member is slidably attached to the telescoping segment.

Example 13

A thirteenth exemplary embodiment is a variation of Example 12, wherein the telescoping segment defines a slot, wherein the vehicle engagement member is slidably contained within the slot.

Example 14

A fourteenth exemplary embodiment is a variation of Example 1, wherein the lift assembly comprises an inground housing.

Example 15

A fifteenth exemplary embodiment is a variation of Example 14, wherein the lift assembly comprises a base plate fixed relative to the inground housing.

Example 16

A sixteenth exemplary embodiment is a variation of Example 1, further comprising a second arm pivotally attached to the yoke structure.

Example 17

A seventeenth exemplary embodiment is a variation of Example 16, wherein the second arm is pivotally attached to the yoke structure via a second pin.

Example 18

An eighteenth exemplary embodiment is a variation of Example 17, wherein the second pin is inhibited from rotating relative to the yoke structure.

Example 19

A nineteenth exemplary embodiment is a lift assembly, comprising (a) a lifting structure configured to actuate relative to the ground between a lowered position and a raised position; (b) a lifting arm coupled with the lifting structure such that the lifting arm is configured to actuate with the lifting structure between the lowered position and the raised position; (c) a yoke structure fixed to the lifting structure, wherein the yoke structure comprises an anti-rotational surface defining a portion of a through hole; and (d) a pin configured to couple the lifting arm with the yoke structure such that the lifting arm is configured to rotate relative to the yoke structure about a longitudinal axis of the pin, wherein the pin comprises a complementary anti-rotational surface configured to mate with the anti-rotational surface of the yoke structure to thereby inhibit rotation of the pin about the longitudinal axis relative to the yoke structure.

Example 20

A twentieth exemplary embodiment is a lift assembly, comprising (a) a lifting post configured to actuate relative to the ground between a lowered position and a raised position; (b) a lifting arm coupled with the lifting post such that the lifting arm is configured to actuate with the lifting post between the lowered position and the raised position; (c) a yoke structure fixed to the lifting post, wherein the yoke structure comprises a tongue defining a pin opening, wherein the pin opening comprises an anti-rotational surface; and (d) a pin pivotally coupling the lifting arm with the yoke structure such that the lifting arm configured to couple the lifting arm with the yoke structure such that the lifting arm is configured to rotate relative to the yoke structure about a longitudinal axis of the pin, wherein the anti-rotational surface of the yoke structure is configured to inhibit rotation of the pin relative to the yoke structure about the longitudinal axis of the pin.

We claim:

1. A lift assembly, comprising:
   (a) a lifting structure configured to actuate relative to the ground between a lowered position and a raised position;
   (b) a lifting arm coupled with the lifting structure, where the lifting arm is configured to actuate with the lifting structure between the lowered position and the raised position;
   (c) a yoke structure fixed to the lifting structure;
   (d) a pin configured to couple the lifting arm with the yoke structure such that the lifting arm is configured to rotate relative to the yoke structure about a longitudinal axis of the pin; and
   (e) an integrated anti-rotational assembly associated with both the yoke structure and the pin, wherein the integrated anti-rotational assembly is configured to inhibit rotation of the pin relative to the yoke structure about the longitudinal axis of the pin while the lifting arm rotates relative to the yoke structure.

2. The lift assembly of claim 1, wherein the integrated anti-rotational assembly comprises a D-shaped through hole defined by the yoke structure.

3. The lift assembly of claim 2, wherein the integrated anti-rotational assembly comprises a D-shaped projection of the pin, wherein the D-shaped projection is dimensioned to fit within the D-shaped through hole.

4. The lift assembly of claim 3, wherein the D-shaped through hole comprises a linear surface and a circumferentially extending surface, wherein the linear surface is closer to a vehicle engagement side of the yoke structure, and wherein the circumferentially extending surface is closer to a rear side of the yoke structure.

5. The lift assembly of claim 1, wherein the yoke structure comprises a top plate and a bottom plate.

6. The lift assembly of claim 5, wherein the bottom plate comprises a fixing feature configured to accommodate fixing the yoke structure to the lifting structure.

7. The lift assembly of claim 6, wherein the fixing feature comprises a plurality of through holes.

8. The lift assembly of claim 7, wherein the top plate defines a plurality of access holes.

9. The lift assembly of claim 5, wherein the top plate and the bottom plate are fixed to each other via a plurality of vertical walls.

10. The lift assembly of claim 1, wherein the lifting arm comprises a base segment and a telescoping segment configured to actuate relative to each other in order to adjust a length of the lifting arm.

11. The lift assembly of claim 10, wherein the lifting arm further comprises a vehicle engagement member extending from the telescoping segment.

12. The lift assembly of claim 11, wherein the vehicle engagement member is slidably attached to the telescoping segment.

13. The lift assembly of claim 12, wherein the telescoping segment defines a slot, wherein the vehicle engagement member is slidably contained within the slot.

14. The lift assembly of claim 1, wherein the lift assembly comprises an inground housing.

15. The lift assembly of claim 14, wherein the lift assembly comprises a base plate fixed relative to the inground housing.

16. The lift assembly of claim 1, further comprising a second arm pivotally attached to the yoke structure.

17. The lift assembly of claim 16, wherein the second arm is pivotally attached to the yoke structure via a second pin.

18. The lift assembly of claim 17, wherein the second pin is inhibited from rotating relative to the yoke structure.

19. A lift assembly, comprising:
(a) a lifting structure configured to actuate relative to the ground between a lowered position and a raised position;
(b) a lifting arm coupled with the lifting structure such that the lifting arm is configured to actuate with the lifting structure between the lowered position and the raised position;
(c) a yoke structure fixed to the lifting structure, wherein the yoke structure comprises an anti-rotational surface defining a portion of a through hole; and
(d) a pin configured to couple the lifting arm with the yoke structure such that the lifting arm is configured to rotate relative to the yoke structure about a longitudinal axis of the pin, wherein the pin comprises a complementary anti-rotational surface configured to mate with the anti-rotational surface of the yoke structure to thereby inhibit rotation of the pin about the longitudinal axis relative to the yoke structure while the lifting arm rotates relative to the yoke structure.

20. A lift assembly, comprising:
(a) a lifting post configured to actuate relative to the ground between a lowered position and a raised position;
(b) a lifting arm coupled with the lifting post such that the lifting arm is configured to actuate with the lifting post between the lowered position and the raised position;
(c) a yoke structure fixed to the lifting post, wherein the yoke structure comprises a tongue defining a pin opening, wherein the pin opening comprises an anti-rotational surface; and
(d) a pin pivotally coupling the lifting arm with the yoke structure such that the lifting arm configured to couple the lifting arm with the yoke structure such that the lifting arm is configured to rotate relative to the yoke structure about a longitudinal axis of the pin, wherein the anti-rotational surface of the yoke structure is configured to inhibit rotation of the pin relative to the yoke structure about the longitudinal axis of the pin while the lifting arm rotates relative to the yoke structure.

* * * * *